United States Patent
Bogoutdinov et al.

(10) Patent No.: US 12,436,293 B2
(45) Date of Patent: Oct. 7, 2025

(54) MULTICHANNEL SYNCHRONOUS ANALYSIS SYSTEM FOR ANALYZING GLOBAL NAVIGATION SATELLITE SYSTEM SIGNALS AND METHODS OF SIGNAL PROCESSING

(71) Applicant: Topcon Positioning Systems, Inc., Livermore, CA (US)

(72) Inventors: Sergey Sayarovich Bogoutdinov, Moscow (RU); Fedor Borisovich Serkin, Moscow (RU); Andrey Vladimirovich Veitsel, Moscow (RU); Dmitry Yuryevich Goldberg, Moscow (RU); Dmitry Anatolyevich Rubtsov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 17/906,271

(22) PCT Filed: Oct. 11, 2021

(86) PCT No.: PCT/RU2021/000432
§ 371 (c)(1),
(2) Date: Apr. 20, 2023

(87) PCT Pub. No.: WO2023/063841
PCT Pub. Date: Apr. 20, 2023

(65) Prior Publication Data
US 2023/0384458 A1 Nov. 30, 2023

(51) Int. Cl.
*G01S 19/21* (2010.01)
*G01S 19/37* (2010.01)

(52) U.S. Cl.
CPC .............. *G01S 19/21* (2013.01); *G01S 19/37* (2013.01)

(58) Field of Classification Search
CPC .................................. G01S 19/21; G01S 19/37
(Continued)

(56) References Cited

U.S. PATENT DOCUMENTS

| 6,118,808 A | 9/2000 | Tiemann et al. |
| 7,395,155 B2 | 7/2008 | Hsu |

(Continued)

FOREIGN PATENT DOCUMENTS

| CN | 1522507 A | 8/2004 |
| CN | 1543714 A | 11/2004 |

(Continued)

OTHER PUBLICATIONS

Extended European Search Report mailed May 8, 2025, in connection with European Patent Application No. 21960762.9, filed May 1, 2024, 9 pgs.

(Continued)

*Primary Examiner* — Lester G Kincaid
(74) *Attorney, Agent, or Firm* — Chiesa Shahinian & Giantomasi PC

(57) ABSTRACT

An apparatus includes an antenna, RF path, Analog to Digital convertor (ADC), filter, and navigation channel for processing a received GNSS signal based on a navigation clock. A communication modem is configured to receive the signal via a first antenna, RF path, and ADC and process the received signal in order to generate a signal based on a modem clock. The communication modem is further configured to transmit the signal based on the modem clock using a R+1 antenna via a R+1 RF path and a Digital to Analog Convertor (DAC). A multichannel synchronous signal analysis system (MSSAS) receives outputs of the ADCs and processes them using a plurality of decimators and plurality data receivers. Each of the decimators is configured to process the outputs of the ADCs and output data to one of (Continued)

a plurality of data receivers. A CPU is configured to control all of the devices.

22 Claims, 5 Drawing Sheets

(58) Field of Classification Search
    USPC .................................................. 455/456.1
    See application file for complete search history.

(56) References Cited

U.S. PATENT DOCUMENTS

| | | | |
|---|---|---|---|
| 7,630,430 | B2 | 12/2009 | Bochkovskiy et al. |
| 7,852,264 | B2 | 12/2010 | Zaruba et al. |
| 8,111,735 | B2 | 2/2012 | Chen |
| 8,170,086 | B2 | 5/2012 | Abraham et al. |
| 8,193,980 | B2 | 6/2012 | Nayyar |
| 8,391,339 | B2 | 3/2013 | Wang et al. |
| 8,630,332 | B2 | 1/2014 | Young |
| 8,681,042 | B2 | 3/2014 | Martin et al. |
| 8,842,717 | B2 | 9/2014 | King |
| 9,596,610 | B1 | 3/2017 | Querol et al. |
| 10,281,556 | B2 | 5/2019 | Mahmood et al. |
| 10,809,385 | B2 | 10/2020 | Rubtsov et al. |
| 10,880,029 | B2 | 12/2020 | Lennen |
| 10,942,280 | B2 | 3/2021 | Anderson et al. |
| 10,943,461 | B2 | 3/2021 | Kleinbeck |
| 10,945,146 | B2 | 3/2021 | Kleinbeck et al. |
| 2002/0193108 | A1 | 12/2002 | Robinett |
| 2003/0012874 | A1 | 1/2003 | Lange et al. |
| 2003/0081660 | A1 | 5/2003 | King et al. |
| 2004/0095275 | A1 | 5/2004 | Warloe et al. |
| 2008/0232441 | A1 | 9/2008 | Mester et al. |
| 2009/0189808 | A1 | 7/2009 | Chen et al. |
| 2010/0159958 | A1 | 6/2010 | Naguib et al. |
| 2011/0181467 | A1 | 7/2011 | Samavati et al. |
| 2012/0038512 | A1 | 2/2012 | Geswender et al. |
| 2013/0035099 | A1 | 2/2013 | Boejer et al. |
| 2014/0028499 | A1 | 1/2014 | Yeh et al. |
| 2016/0245923 | A1 | 8/2016 | Badke |
| 2018/0356531 | A1 | 12/2018 | Naveen et al. |
| 2020/0344093 | A1 | 10/2020 | Pinto et al. |
| 2021/0055425 | A1 | 2/2021 | Guo et al. |
| 2021/0119719 | A1 | 4/2021 | Jantti |
| 2021/0226776 | A1 | 7/2021 | Falk |
| 2022/0276389 | A1 | 9/2022 | Yu et al. |
| 2024/0069215 | A1 | 2/2024 | Rubtsov et al. |

FOREIGN PATENT DOCUMENTS

| | | |
|---|---|---|
| CN | 111399004 A | 7/2020 |
| CN | 112394374 A | 2/2021 |
| CN | 113141342 A | 7/2021 |
| EP | 3413089 B1 | 10/2019 |
| JP | 2005525005 A | 8/2005 |
| JP | 2013518281 A | 5/2013 |

OTHER PUBLICATIONS

First Office Action mailed Sep. 7, 2024 in connection with Chinese Patent Application No. 202180101963.9, filed Feb. 28, 2024, 12 pgs. (including translation).
Non-Final Office Action mailed Sep. 26, 2024 mailed in connection with U.S. Appl. No. 17/753,821, filed Mar. 15, 2022, 19 pgs.
International Search Report and Written Opinion mailed Jul. 7, 2022, in connection with International Patent Application No. PCT/RU2021/000432, filed Oct. 11, 2021, 8 pgs.
International Search Report and Written Opinion mailed May 19, 2022, in connection with International Patent Application No. PCT/RU2021/000375, filed Aug. 31, 2021, 10 pgs.
Notice of Allowance mailed Mar. 13, 2024 in connection with U.S. Appl. No. 17/753,821, filed Mar. 15, 2022, 20 pgs.
First Office Action mailed Feb. 12, 2025 in connection with Chinese Patent Application No. 202180103206.5, filed Apr. 10, 2024, 13 pgs. (including translation).
Office Action mailed Jul. 1, 2025, in connection with Japanese Patent Application No. 2024-513488, filed Feb. 28, 2024, 9 pgs. (including translation).
Decision to Grant mailed Aug. 19, 2025, in connection with Japanese Patent Application No. 2024-521144, 6 pgs. (including translation).

MULTICHANNEL SYNCHRONOUS ANALYSIS SYSTEM FOR ANALYZING GLOBAL NAVIGATION SATELLITE SYSTEM SIGNALS AND METHODS OF SIGNAL PROCESSING

FIELD OF THE INVENTION

The present disclosure relates generally to multichannel systems for signal analyzing and methods of signal processing and, in particular, to systems performing signal spectrum analysis, interference search, verification of the input digital-analog path, and processing the digitized input signal.

BACKGROUND

Acquiring, identifying, and reducing interference in global navigation satellite system (GNSS) satellite signals at a GNSS receiver can take a significant amount of time. Various techniques for signal processing, both in time and frequency domains, to reduce the time required are known. In one method, a spectrum analyzer can serve as a fast Fourier transformation (FFT) and can be used to reduce interference in a positioning mode. Other methods use an interference suppressor consisting of an FFT module, interference detection and nulling processor module, IFFT module, correlator module, filter, delay module, decimator, and correlator. What is needed is a method for reducing the amount of time required to acquire and identify GNSS signals that requires fewer and less expensive hardware components than what is typically required.

SUMMARY

In one embodiment, the input of a first receiving antenna receives a signal from a communication modem. The received signal passes through a first RF path and is digitized in a first analog to digital convertor ("ADC"). The digitized signal output of the first ADC is input to a multiplexer. The output of the first ADC is also input to a communication modem where it is processed. From the output of the communication modem, the signal is input to a digital to analog convertor ("DAC") and then to an RF path connected to the DAC. From the output of the RF path connected to the DAC the signal is sent to a transmitting antenna. In one embodiment, a receiving antenna and a transmitting antenna can be replaced by a single transceiver antenna.

The input of a second receiving antenna receives a global navigation satellite system ("GNSS") signal that then passes through a second RF path and is digitized in a second ADC connected to the second RF path. From the output of the second ADC, the digitized signal enters the multiplexer. The output of the second ADC also enters a filter and is then input to a navigation channel where it is processed. In one embodiment, the signals from the RF paths may be transmitted from a single antenna.

In one embodiment, a plurality of filters may be used at the input of one or more of the ADCs, such as the second is connected to one of the plurality of filters. The outputs of the plurality of filters are supplied to the inputs of the navigation channels. In one embodiment, the plurality of filters are controlled by a CPU.

Depending on the device being implemented, an antenna, an RF path, and an ADC can be used to receive various signals such as corrections for GNSS and/or modem corrections. In one embodiment, a signal is received at the input of a receiving antenna, passes through an RF path, and is digitized in an ADC. The output of the ADC is then input to a multiplexer.

In one embodiment, a multichannel synchronous signals analysis system ("MSSAS") is also part of the apparatus and is configured to receive the output of the ADCs and process those outputs using a plurality of decimators each configured to output data to one of a respective plurality of data receivers.

In one embodiment, the CPU initializes and controls: the communication modem, the filter, the navigation channels, the multiplexer, and the MSSAS.

In one embodiment, an apparatus includes a first antenna configured to receive a signal, a first RF path to receive and process the signal from the first antenna, a first ADC to receive and digitize the processed signal from the first RF path, and a communication modem configured to receive and process the digitized signal from the first ADC based on a modem clock to generate a first processed signal, the communication modem further configured to transmit the first processed signal, the communication modem further configured to transmit the first processed signal to a DAC to convert the first processed signal from a digital signal to an analog signal and transmit the analog first processed signal to an R+1 antenna via an R+1 RF path. A second antenna is configured to receive a GNSS signal and a second RF path configured to receive and process the GNSS signal from the second antenna. A second ADC is configured to receive and digitize the processed GNSS signal from the second RF path and a filter is configured to receive and filter the digitized GNSS signal from the second ADC. A navigation channel is configured to receive and process the filtered GNSS signal from the filter. An R antenna to receive the signal and an R RF path is configured to receive and process the signal from the R antenna based on an R clock (where R can be a system clock or other clock) to generate a second processed signal. An R ADC is configured to receive and digitize the second processed signal from the R RF path. A MSSAS is configured to receive output of the first ADC, the second ADC, and the R ADC, and process the output of the first ADC, the second ADC, and the R ADC using a plurality of decimators, each decimator configured to output data to one of a respective plurality of data receivers. A CPU is configured to control the first RF path, the second RF path, the R RF path, and the R+1 RF path, the first ADC, the second ADC, and the R ADC, the DAC, the communication modem, the filter, the navigation channel, and the MSSAS.

DETAILED DESCRIPTION

Figure 1:
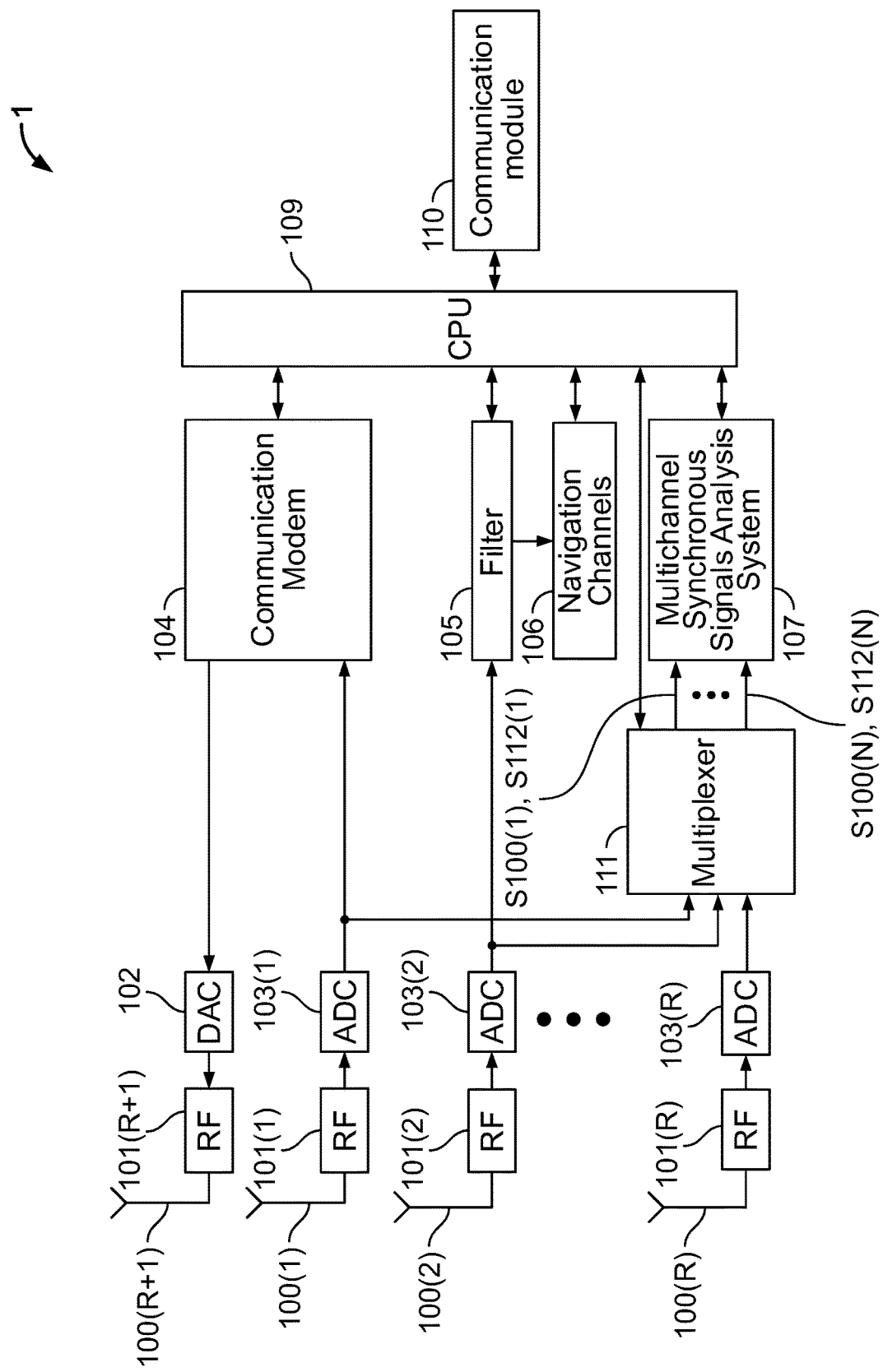
FIG. 1 shows a receiver according to an embodiment.

FIG. 1 shows a schematic of Global Navigation Satellite System (GNSS) receiver 1 according to an embodiment. Receiver 1, in one embodiment, comprises multiple antennas 100(1), 100(2), . . . , 100(R), 100(R+1) (collectively referred to as antenna 100). Each antenna 100 is in communication with a respective one of RF paths 101(1), 101(2), 101(R), . . . 101(R+1). RF paths 100(1), 100(2), . . . 100(R) are each in communication with a respective one of analog to digital convertors (ADC) 103(1), 103(2), . . . , 103(R). RF path 101(R+1) is in communication with digital to analog convertor (DAC) 102. DAC 102 is in communication with communication modem 104 which is in communication with CPU 109. ADC 103(1) is in communication with communication modem 104 and multiplexer 111. ADC 103(2) is in communication with multiplexer 111 and filter 105, which is in communication with navigation channels 106 and CPU 109. Navigation channels 106 is also in communication with CPU 109. ADC 103(R) is in communication with multiplexer 111. A number R of ADCs are similarly connected to multiplexer 111. Multiplexer 111 is in communication with CPU 109 and multichannel synchronous signals analysis system (MSSAS) 107, which is also in communication with CPU 109. Multiplexer 111 transmits signals S100(1) . . . S100(N) which comprise the ADC data bus and signals S112(1) . . . S112(N) which comprise ADC clock signals to MSSAS 107.

In one embodiment, receiver 1 operates as follows. A GNSS signal from a satellite arrives at antenna 100(2), passes through RF-path 101(2) to ADC 103(2). The digitized signal is input to filter 105 and multiplexer 111. The signal passes filter 105 and is input to navigation channels 106 where it is processed.

A signal is received by antenna 100(1) and is input to ADC 103(1) via RF path 101(1). A digitized signal output from ADC 103(1) is then input to communication modem 104 and processed. Communication modem 104, in one embodiment, serves as a receiver and transmitter of data. Communication modem 104 generates a signal that is transmitted to DAC 102 which transmits the signal through RF path 101(R+1) to antenna 100(R+1). The digitized signal output from ADC 103(1) is also input to multiplexer 111.

The signal is also received by antenna 100(R) and passes through the RF path 101(R) to ADC 103(R). A digitized signal output from ADC 103(R) is input to multiplexer 111.

Digitized signals and ADC clocks from ADCs 103 (1) . . . 103(R) are input and manipulated by multiplexer 111. In multiplexer 111, the output data and dock of each of ADC (1) . . . ADC(R) are processed and output as signals S100 (1 . . . N) and S112(1 . . . N) respectively. From multiplexer 111, signals S100(1) . . . S100(N) and S112(1) . . . S100(N) are input to Multichannel Synchronous Analysis System (MSSAS) 107. In MSSAS 107, signals from ADC 103(1) . . . ADC 103(R) are further processed as described below.

In one embodiment, CPU 109 controls operation of communication modem 104, filter 105. navigation channels 106, multiplexer 111 and MSSAS 107. In one embodiment, a user can implement data exchange with CPU 109 via communication module 110.

The components of receiver, in one embodiment, operate at different frequencies (dock speeds, for example, generated by one or more crystal oscillators): ADC 103(1), communication modem 104, and DAC 102 operate at communication clock CLKcom; ADC 103(2), filter 105, navigation channels 106 operate at navigation clock CLKnav; ADC 103(R) operates at system clock CLKsys or other clock CLKother.

In one embodiment, when a stream of data is received from ADC 103 (1) . . . ADC 103(R), a portion of MSSAS 107 operates at ADC clock (CLKadc), and a different portion of MSSAS 107 operates at CLKsys. After data and ADC 103 (1) . . . ADC 103(R) dock have passed through multiplexer 111, CLKcom, CLKnav, CLKother and CLKsys can be a source of clock CLKadc. Data received by MSSAS 107 is re-synchronized from clock CLKadc to clock CLKsys, and the signals are processed at clock CLKsys.

For example, if it is needed to process a GNSS signal, data from filter 105, navigation channels 106, and ADC 103(2) are input to MSSAS 107, and clock CLKnav serves as clock CLKadc. The size of ADC 103 data bus is equal to A bit where A is an positive integer number. Signal S100 (1) . . . S100(N) is A bit capacity.

In one embodiment, MSSAS 107 can partly execute functions of communication modem 104. For example, the hardware used for MSSAS 107 can include additional processing power to also execute operations pertaining to communication modem 104. When MSSAS 107 includes additional processing power, communication modem 104 can include less processing power and vice versa.

Figure 2:
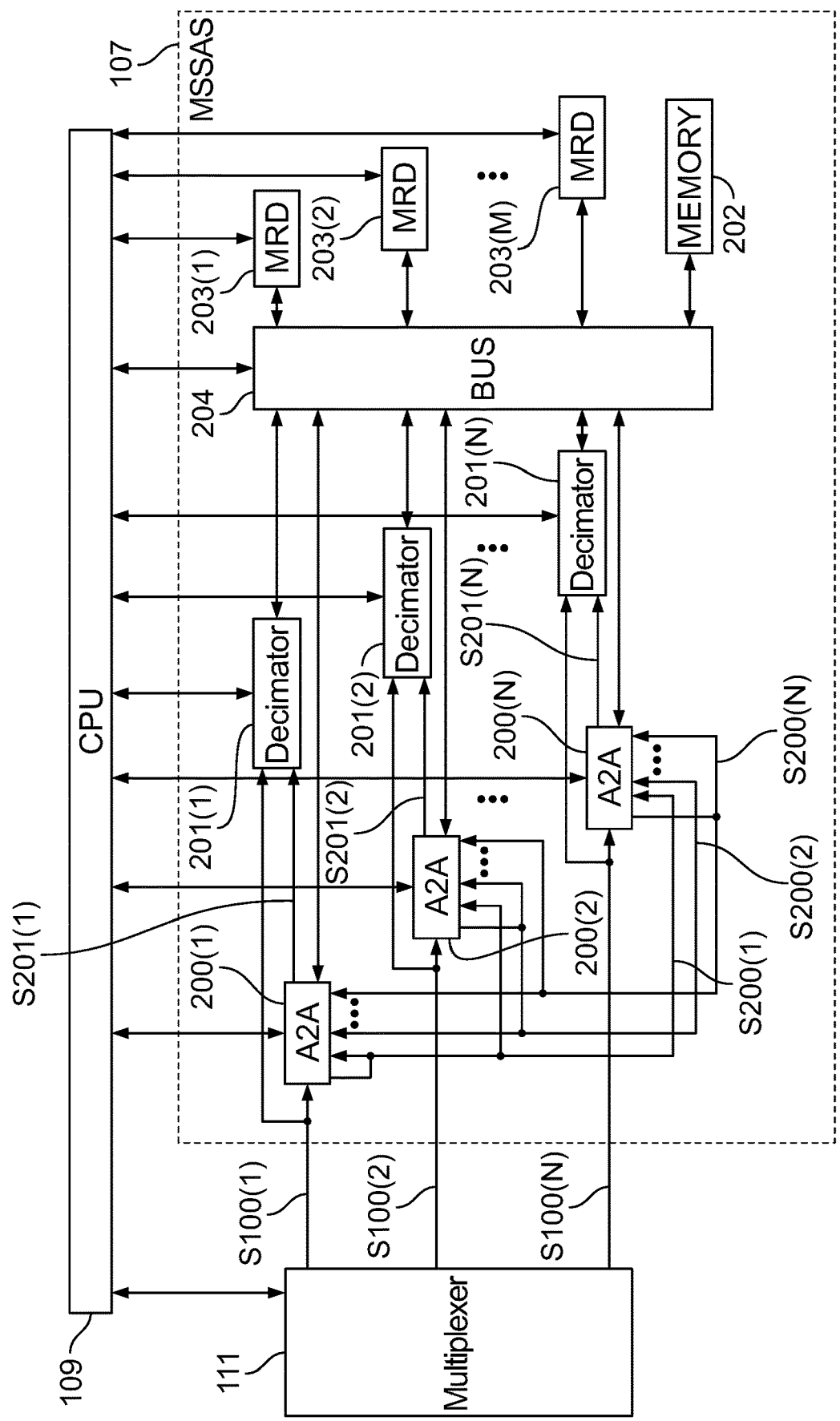
FIG. 2 shows details of a multichannel synchronous signals analysis system shown in FIG. 1 according to an embodiment.

FIG. 2 shows details of multichannel synchronous signal analyzing system (MSSAS) 107 shown in FIG. 1 according to an embodiment. MSSAS 107 is configured to analyze input signals for, for example, interference suppression, during operation of communication modem 104 and processing of GNSS signals.

In one embodiment, MSSAS 107 comprises preliminary ADC data processor/handlers 0) 200(1) . . . 200(N) which are in communication with each other A2A 200 and CPU 109, bus 204, and multiplexer 111. Each of A2A 200(1) . . . 200(N) are also in communication with a respective one of decimator 201(1), 201(2), . . . , 201(N). Each of decimators 201(1), 201(2), . . . , 201(N) are also in communication with CPU 109 and bus 204. Bus 204 is in communication with CPU 109, memory 202 and mixed radix discrete Fourier transform (MRD) 203(1), 203(2), . . . 203(M). Priority signals S200(1), S200(2), . . . , S200(N) are transmitted and received among A2A 200(1) . . . 200(N). Enabling signals S201(1), S201(2), . . . , S201(N) are transmitted from each of A2A 200(1), A2A 200(2), . . . , A2A 200(N) to each respective decimator 201(1), 201(2), . . . , 201(N).

For the following description, CPU 109, memory 202 and MRD 203 will be referred to as "data receivers" meaning that those devices receive data. A2A 200(1), A2A 200(2), . . . , A2A 200(N) (referred to collectively as "A2A 200") is the preliminary processor of data from ADC 103(1) . . . ADC 103(R) (referred to collectively as "ADC 103"). A2A 200 converts data from ADC 103 into a format required for data receivers. In one embodiment, a package is an output data stream from A2A 200 and is defined as a set of data received from an ADC and transmitted to any data receiver via one of A2A 200(1), A2A 200(2), . . . , A2A 200(N). Minimal package size of X-bit data is equal to the width of bus 204. If needed, some service information can be added to the package from A2A 200 (for example, at least X number of bits). CPU 109 can change the configuration of the package and data receiver in the process of operating A2A 200. Note that, in one embodiment, new settings of A2A 200 are considered valid after sending the package. A2A 200, when operating with memory 202, assigns the starting address and the ending address. Recording of the package starts from the starting address, and when the ending address is reached, the next record is implemented according to the starting address, i.e., cyclic recording is implemented to the address space of memory 202.

Decimator 201(1), 201(2), . . . , 201(N) (referred to collectively as "decimator 201") decimates the signal using different decimation coefficients from 1 to 64, and transmits the signal via bus 204 to any data receiver. Data processing in decimator 201 can be synchronized with A2A 200. In one embodiment, we refer to the data from the output of decimator 201 the decimated package with minimal size of X number of bits.

Decimator 201, in an independent mode from A2A 200, processes data from ADC 103, where the size of the decimated package is determined by CPU 109 and does not depend on synchronization signal S201. In case of synchronous operation with A2A 200, decimator 201 receives data from ADC 103, and, if synchronization signal S201 is available, processes it.

CPU 109 can change the configuration of the decimated package and data receiver during operation with decimator 201. New settings of decimator 201 are valid after ending the decimated package.

MRD 203(1), 203(2), . . . 203(N) (referred to collectively as "MRD 203") blocks with forward and inverse complex FFT/DFT support. MRD 203 places results of data processing in a location based on an indicated address. MRD 203 has ability to place results of data processing to CPU 109 or memory 202. The first data in the received parcel is service data that sets the mode of operation of the MRD.

In one embodiment, architecture AXI interconnect is used for bus 204. This architecture guarantees a high rate of data transmission and quick access to the data.

In one embodiment, MSSAS 107 operates as follows. CPU 109 initiates and controls: A2A 200, Decimator 201, and MRD 203.

Signal S100(1), S100(2), . . . , S100(N) (collectively referred to as signal S100) are each input to respective A2A 200 and Decimator 201. In A2A 200 and decimator 201, data is processed and then transmitted via bus 204 to additional locations and/or devices.

From A2A 200, enabling signal S201(1), 201(2), . . . , 201(N) (collectively referred to as enabling signal S201) are input to decimator 201. Enabling signal S201 provides the possibility of synchronous data processing in A2A 200 and decimator 201. From each A2A 200, priority signal S200 is input to each A2A 200. During initialization A2A 200 selects one of signals S200, which define priority and work together with A2A 200. If such a selected signal S200(1), S200(2), . . . , S200(N) (collectively referred to as priority signal S200) is available, A2A 200 transmits the package and generates selected signal S200 taking a number of current A2A. Priority signal S200 is used for multiple A2A 200s to work together. When priority signals S200 are used, the first unit A2A 200 is started by CPU 109, then A2A 200 is started according to priority signal S200. When priority signals S200 are not used, the A2A 200 is run by CPU 109.

MRD 203 receives data from each A2A 200 and decimator 201 via bus 204 and processes it. CPU 109 receives data from each A2A 200, decimator 201, MRD 203 and memory 202 via bus 204 and processes it. Memory 202 receives data from any of A2A 200, decimator 200 and MRD 203 via bus 204. A2A 200 and decimator 201 re-synchronize data from ADC 103 from clock CLKadc to clock CLKsys.

In one embodiment, the size of bus 204 is equal to X number of bits. Data from ADC 103 with dimension A bits is fed to the input of A2A 200 and decimator 201. From A2A 200 and Decimator 201 X-bits data outputs (data width of bus 204 is X number of bits).

If CPU 109 switches off A2A 200, then A2A 200 will be off only when the package is fully transmitted. If CPU 109 switches decimator 201 off, then decimator 201 will be off only when the decimated package is fully transmitted.

In one embodiment, operation modes of each of unit A2A 200 is as follows.

1) A2A 200 separable/divided with the assigned number of packages.
Before operation, CPU 109 initiates A2A 200. Then, A2A sends the preset number of packages to any data receiver and then it is switched off.
2) A2A 200 Separable with the Unlimited Number of Packages.
Before operation, CPU 109 initiates A2A 200. Then, A2A sends the unlimited number of packages to any data receiver. If needed, CPU 109 switches off A2A 200.
3) A2A 200 co-joint with the assigned number of packages.
CPU 109 programs the following:
   A) the necessary number of units 200 which operate in a co-joint mode;
   B) the order of priority for units 200 with the help of signals S200; and
   C) the mode with the assigned number of packages.
A2A 200 alternately sends single packages, after sending of the package, signal S200 in A2A 200 are generated. A2A 200 expects priority signal S200 to send next package. If A2A 200 sent the assigned number of single packages, then A2A 200 is switched off.
4) A2A 200 co-joint with the unlimited number of packages.
CPU 109 programs the following:
   A) the necessary number of units 200 which operate in a co-joint mode;
   B) the order of priority for units 200 with the help of signals S200; and
   C) the mode with the unlimited number of packages.
A2A 200 alternately sends single packages, after sending of the package, signal S200 in A2A 200 are generated. A2A 200 expects priority signal S200 to send next single package. If needed, CPU 109 switches off A2A 200.

In one embodiment, operation modes of decimator 201 are as follows.

1) Decimator 201 operates independently of A2A 200 and generates the assigned number of decimated packages. Before operation, CPU 109 initiates decimator 201. Decimator 201 then sends the assigned number of decimated packages to any data receiver, and then it is switched off.
2) Decimator 201 operates independently of A2A 200 and generates the unlimited number of decimated packages. Before operation, CPU 109 initiates decimator 201. Decimator 201 then sends the unlimited number of decimated packages to any data receiver, and if needed, CPU 109 switches it off.
3) Decimator 201 synchronously operates with A2A 200 and generates the assigned number of decimated packages. Before operation CPU 109 initiates decimator 201 and A2A 200. If synchronization signal S201 is available, decimator 201 then sends the assigned number of decimated packages to any data receiver, after that it is switched off. A2A 200 sends the assigned number of packages to any data receiver, after that it is switched off. In one embodiment, operation modes when working with MRD, a package can only include services data for MRD, which is sent before data from decimator.
4) Decimator 201 synchronously operates with A2A 200 and generates the unlimited number of decimated packages. Before operation CPU 109 initiates Decimator 201 and A2A 200. If synchronization signal S201 is available decimator 201 then sends the unlimited number of decimated packages to any data receiver. If needed, CPU 109 switches it off. A2A 200 sends the unlimited number of packages to any data receiver, then CPU 109 switches it off. In one embodiment, operation modes when working with MRD, a package can only include services data for MRD, which sent before data from decimator.

Figure 3:
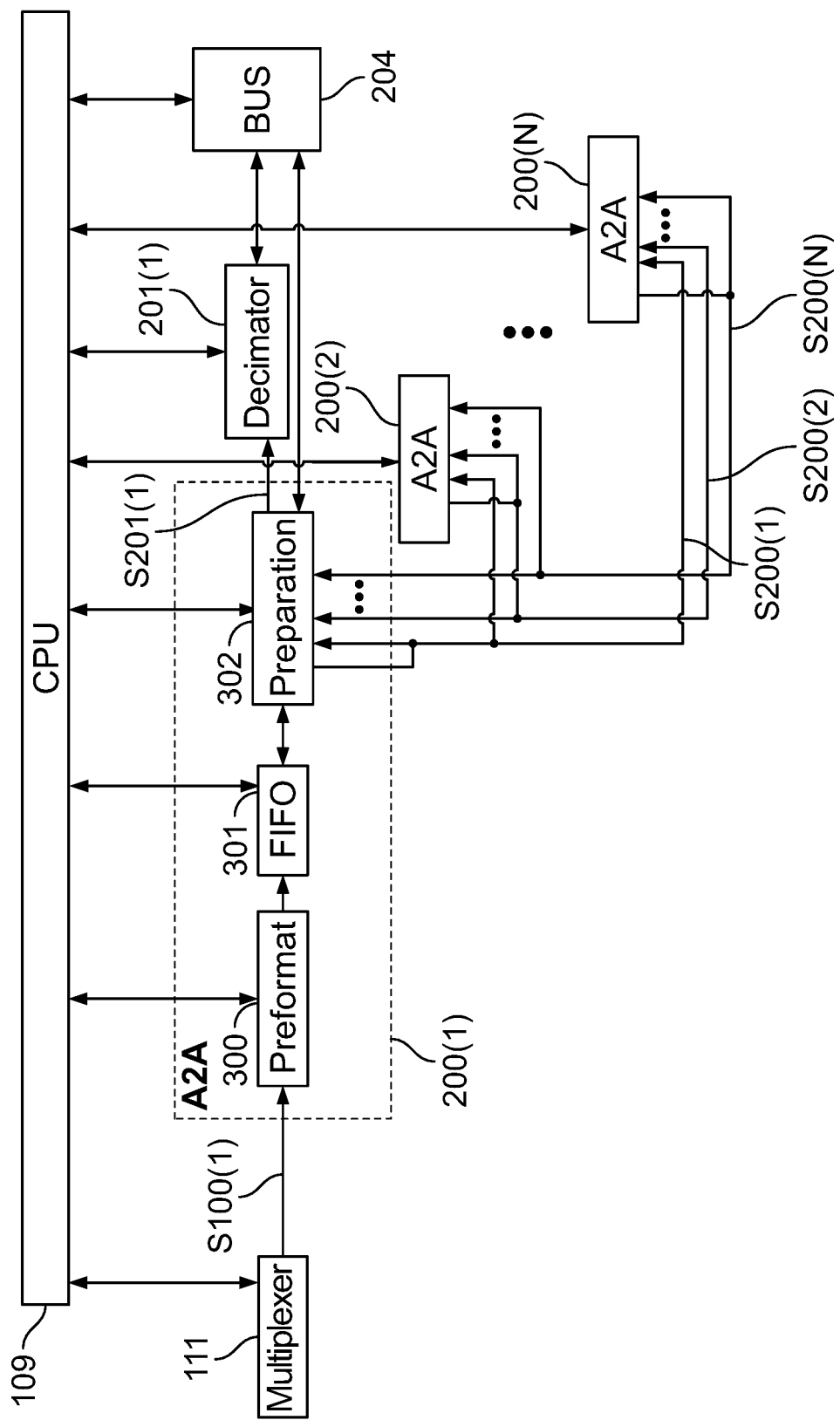
FIG. 3 shows details of a convertor module (referred to as an A2A) shown in FIG. 2 according to an embodiment.

FIG. 3 shows details of A2A 200 shown in FIG. 2. In one embodiment, A2A 200 includes preformat unit 300 in communication with asynchronous two-clock first in, first out (FIFO) unit 301, which is in communication with preparation unit 302.

Preformat unit 300 preliminarily prepares data. In one embodiment, preformat unit 300 can transform/convert the input A-bit data from ADC 103 into W-bit output data in any one of the following ways: expansion of the most significant bits with zeros; expansion of the most significant bits by ones; sign bit extension; Big Little Endian/Little Endian; or permutation of bytes/interchanging of bytes.

FIFO unit 301 implements re-synchronization of data from ADC 103 from clock CLKadc to clock CLKsys. FIFO unit 301 generates an X-bit word from Nword input W-bit words. The following formula is used: $X=W*Nword$, where: Nword is any non-fractional number on the condition that the result X is a multiple of 2n.

The size of FIFO unit 301 is selected such that A2A 200 generates packages one after another, and the packages have enough time to be processed by the data receivers, CPU 109 has time to process the results obtained in memory 202 and in MRD 203 so that FIFO unit 301 does not overflow. The size of FIFO unit 301 is selected such that the data would not be lost. Preformat unit 300 and FIFO unit 301 are also installed in Decimator 201.

Preparation unit 302 processes data from the output of FIFO unit 301 and generates a package. Also, preparation unit 302 generates X-bit data for BUS 204. Preformat unit 300 and the input part of FIFO unit 301 operate at clock CLKadc. Preparation unit 302 and the output part of FIFO unit 301 operate at clock CLKsys.

In one embodiment, A2A 200 operates as follows. CPU 109 controls: preformat unit 300, FIFO unit 301, and preparation unit 302. During initialization of preparation unit 302, FIFO unit 301 is off. After running preparation unit 302, FIFO unit 301 is switched on to generate a package. Data from ADC 103 passes through multiplexer 111 and is input to preformat unit 300. preformat unit 300 preliminarily prepares data. From preformat unit 300, the data is input to FIFO unit 301 and the data from FIFO unit 301 is input to preparation unit 302 wherein it is processed.

If A2A 200 operates synchronously with decimator 201, then preparation unit 302 generates synchronization signal S201. From the output of preparation unit 302, signal S201 is input to decimator 201. Data from the output of preparation unit 302 is transferred to the data receiver via bus 204.

If there is co-joint operation of some A2A 200, preparation unit 302 generates signal S200. Preparation unit 302 waits for priority signal S200, and then generates a package.

Figure 4:
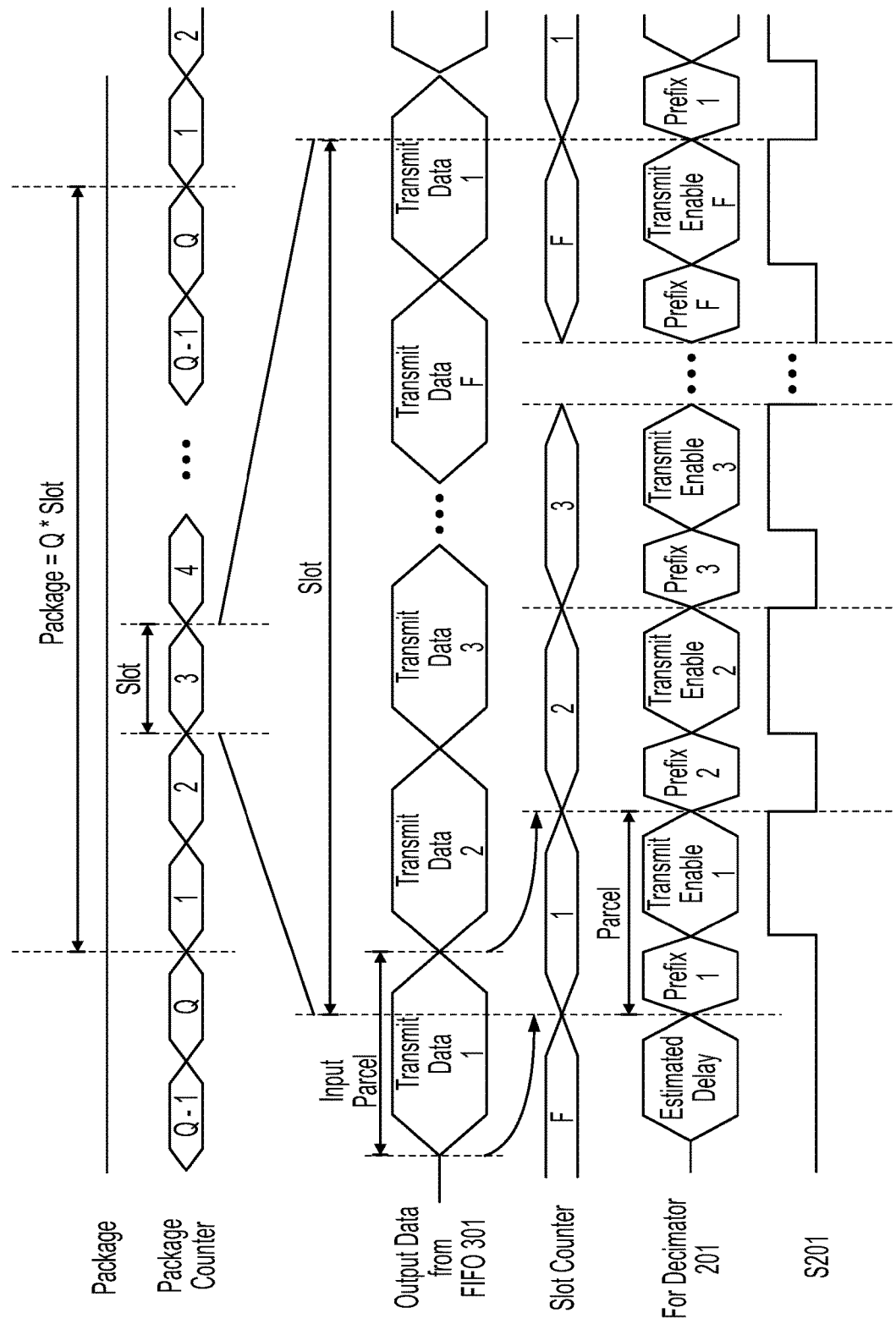
FIG. 4 shows a timing diagram according to an embodiment.

FIG. 4 shows a timing diagram of synchronous operation of A2A 200 and Decimator 201.

In one embodiment, in synchronous mode, data from ADC 103 is simultaneously input to A2A 200 and decimator 201. Digitized symbols output from ADC 103 are input to A2A 200 and decimator 201 where they are processed and then sent to data receivers. A2A 200 assigns the following: package=Q Slots, slot=F parcels, and parcel=one symbol.

The size of a parcel is set by parcel counter 401. Parcel counter 401 counts the number of X-bit words equal to a symbol. The size of a slot is set by the slot counter. The slot counter counts the number of parcels. The size of a package is set by the package counter. The package counter counts the number of slots.

In the data stream from FIFO unit 301 there are symbols which are Input Parcels that include a time marker. A parcel generated by A2A 200 is referred to as a Reference Parcel. A prefix is a programmable part of the Input Parcel, when S201 is inactive and Decimator 201 ignores the input data. Transmit Data is a part of Input Parcel data which is processed in decimator 201 when S201 is active. The time marker allows synchronization of the Input Parcel and the Reference Parcel When processing input parcel (one symbol), A2A 200 generates a data stream which can be supplemented by service data. For example, service data can set parcel amount value for a data receiver, as well as an address to where MRD 203 can put the results. Parcel, in one embodiment, consists of one prefix and one Transmit Enable.

In one embodiment, operation is as follows. Size parameters of parcel, slot, and package in A2A 200 are set before operation of CPU 109. A2A 200 processes and adds data to Memory (or CPU). CPU 109 processes data from A2A 200 and determines boundary offsets of Reference Parcel and Input Parcel relative to each other. To align/adjust Reference Parcel and Input Parcel, in package from A2A 200 there is service data. To adjust Reference Parcel and Input Parcel in decimator 201, Estimated delay can be used, which delays signal S201 generation. During time of the Estimated delay data coming to decimator 201 are ignored. The estimated delay is used one time in the process of synchronizing Reference Parcel and Input Parcel.

CPU 109 adjusts decimator 201. CPU 109 in A2A 200 adjusts also the size of Estimation Delay, Prefix delay, Transmit Data, and data receiver in preparation unit 302. Then, A2A 200 and decimator 201 implement processing data from ADC 103. If needed, CPU 109 can re-configure operation of A2A 200 to synchronize it with decimator 201. New settings of A2A 200 are applied after ending the package sending.

Figure 5:
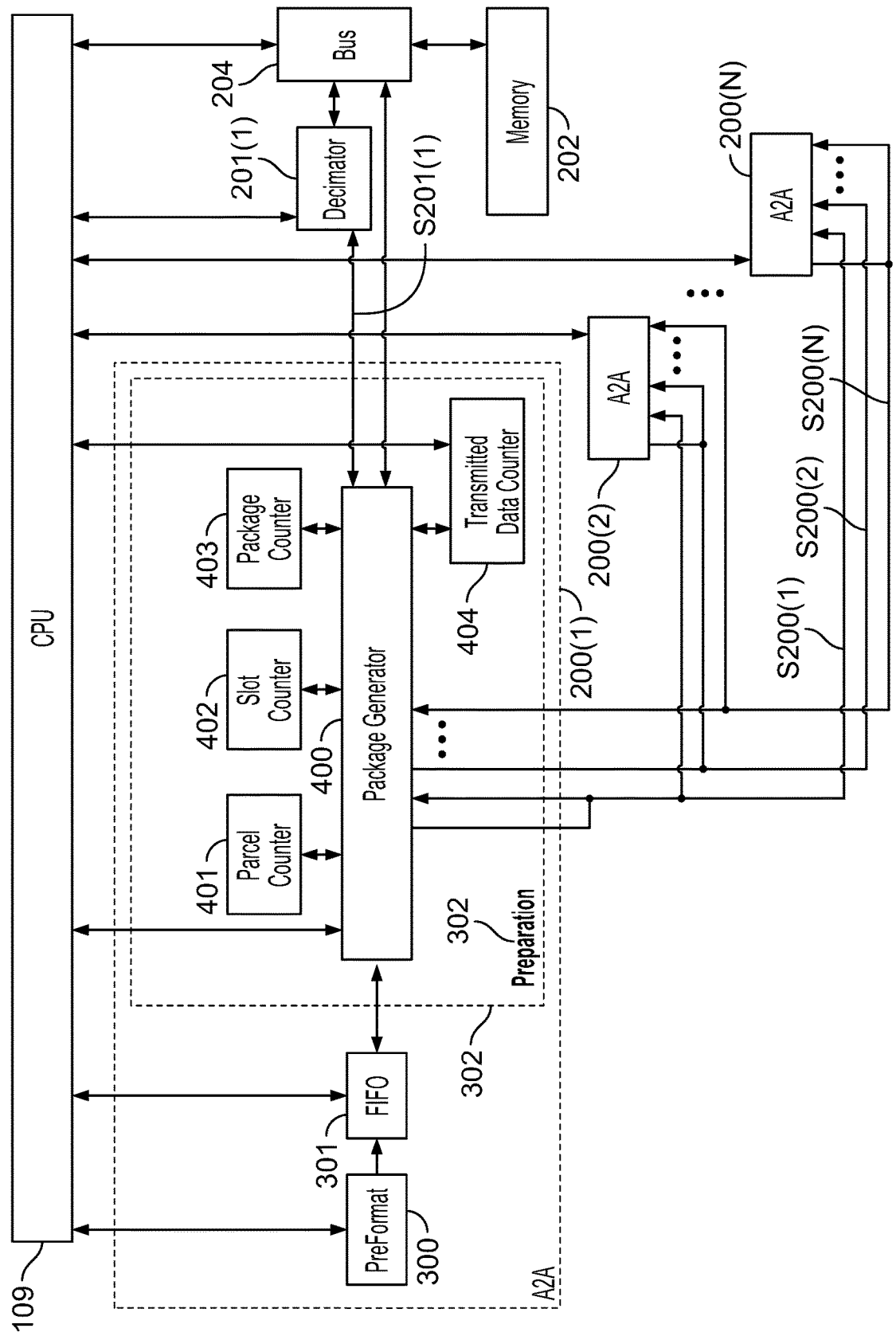
FIG. 5 shows details of a preparation unit according to an embodiment.

FIG. 5 shows details of preparation unit 302. Preparation unit 302 includes Package generator 400, parcel counter 401, slot counter 402, package counter 403, and transmitted data counter 404. In one embodiment, CPU 109 controls package generator 400, parcel counter 401 via package generator 400 (i.e., parcel counter 401 is programmed via CPU 109 via package generator 400), slot counter 402 via package generator 400, package counter 403 via package generator 400, and transmitted data counter 404.

In one embodiment, initialization of preparation unit 302 occurs as follows. During initialization CPU 109 adjusts operation mode of package generator 400 (corresponds to operation mode of A2A 200), parcel counter 401 via package generator 400, slot counter 402 via package generator 400, package counter 403 via package generator 400, FIFO unit 301, and preformat unit 300. Depending on operation mode of package generator 400, decimator 201, data receiver, and A2A 200 can be initialized as well.

FIFO unit 301 is switched on as soon as package generator 400 is started to generate a parcel/package. Data from ADC 103 passes through multiplexer 111 and is fed to preformat unit 300. Preformat unit 300 preliminarily prepares data. From preformat unit 300, the data is input to FIFO unit 301. From FIFO unit 301, data is input to package generator 400 wherein it is processed. During operation of package generator 400 to generate a package, the following counters are used: parcel counter 401, slot counter 402, and package counter 403.

If package generator 400 synchronously operates with decimator 201, then package generator 400 generated synchronization signal S201. From the output of package generator 400 signal S201 is fed to the input of decimator 201. From the output of package generator 400 data is fed to the data receiver via bus 204.

If several A2A 200 modules operate co-jointly, package generator 400 generates signal S200. When priority signals S200 are used, the first unit package generator 400 is started by CPU 109, then package generator 400 is started according to priority signal S200. Package generator 400 waits for priority signal S200 and then generates a package. When priority signals S200 are not used, package generator 400 is run by CPU 109. Transmitted data counter 404 counts the number of X-bit words being transmitted to memory 202 of package generator 400. CPU 109 during its operation reads data counter 404, takes part of data from memory 202 and processes it. After that, CPU 109 reduces the number in transmitted data counter 404 by the number of the processed data from memory 202.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. An apparatus comprising:
   a first antenna configured to receive a first signal;
   a first Radio Frequency (RF) path configured to receive and process the first signal from the first antenna;
   a first ADC configured to receive the processed signal from the first RF path and digitize the processed signal;
   a communication modem configured to receive and process the digitized signal from the first ADC based on a modem clock to generate a first processed signal, the communication modem further configured to transmit the first processed signal, the communication modem further configured to transmit the first processed signal to a Digital to Analog Convertor (DAC) to convert the first processed signal from a digital signal to an analog signal and transmit the analog first processed signal to an R+1 antenna via an R+1 RF path;
   a second antenna configured to receive a Global Navigation Satellite System (GNSS) signal;
   a second RF path configured to receive and process the GNSS signal from the second antenna;
   a second Analog to Digital Convertor (ADC) configured to receive and digitize the processed GNSS signal from the second RF path;
   a filter configured to receive and filter the digitized GNSS signal from the second ADC;
   a navigation channels configured to receive and process the filtered GNSS signal from the filter;
   an R antenna to receive an R signal;
   an R RF path configured to receive and process the R signal from the R antenna based on an R clock to generate a second processed signal;
   an R ADC configured to receive and digitize the second processed signal from the R RF path;
   a multichannel synchronous signals analysis system (MSSAS) configured to receive output of the first ADC, the second ADC, and the R ADC, and process the output of the first ADC, the second ADC, and the R ADC using a plurality of decimators, each decimator configured to output data to one of a respective plurality of data receivers; and
   a CPU configured to control the first RF path, the second RF path, the R RF path, and the R+1 RF path, the first ADC, the second ADC, and the R ADC, the DAC, the communication modem, the filter, the navigation channel, and the MSSAS.

2. The apparatus of claim 1, wherein the MSSAS is further configured to process the ADC outputs and re-synchronize the ADC outputs to a system clock using an asynchronous FIFO unit.

3. The apparatus of claim 1, wherein data and clock signals received from any ADC are commuted in the MSSAS before they are processed.

4. The apparatus of claim 1, wherein the MSSAS is configured to decimate signals from the ADCs and further process those signals.

5. The apparatus of claim 1 wherein the MSSAS is further configured to synchronously process decimated and non-decimated signals from the ADCs.

6. The apparatus of claim 2, wherein the asynchronous FIFO unit is configured to process an entire data stream.

7. The apparatus of claim 1, wherein received data is controlled by service data.

8. The apparatus of claim 1 wherein part of the digitized signals generated by each of the ADCs is deleted after decimation.

9. The apparatus of claim 1, wherein the MSSAS processes digitized signals from multiple ADCs simultaneously.

10. A method comprising:
    generating a signal based on a modem clock using a first signal received from a first antenna through a first RF path and a first ADC at a communication modem;
    transmitting the generated signal based on the modem clock from the communication modem to an R+1 antenna via a Digital to Analog Convertor (DAC) and an R+1 RF path;
    generating a processed signal at a navigation channel by processing a filtered signal received from a filter, the filter receiving and filtering a digitized GNSS signal received from a second ADC in communication with a second RF path, the second RF path processing a GNSS signal based on a navigation clock, the GNSS signal received from a second antenna that received the GNSS signal;
    digitizing an R signal received at an R ADC from an R antenna via an R RF path configured to process the R signal based on an R clock;
    receiving output of the first ADC, the second ADC, and the R ADC, at a multichannel synchronous signals analysis system (MSSAS) configured to process the output of the first ADC, the second ADC, and the R ADC using a plurality of decimators each configured to output data to one of a respective plurality of data receivers; and
    controlling, by a CPU, the first RF path, the second RF path, the R RF path, and the R+1 RF path, the first ADC, the second ADC, and the R ADC, the DAC, the communication modem, the filter, the navigation channel, and the MSSAS.

11. The method of claim 10, wherein the ADC outputs are input to the MSSAS which is further configured to process the ADC outputs and re-synchronize the ADC outputs to a system clock using an asynchronous FIFO unit.

12. The method of claim 10, wherein data and clock signals received from any ADC are commuted in the MSSAS before they are processed.

13. The method of claim 10, wherein the MSSAS is configured to decimate signals from the ADCs and further process those signals.

14. The method of claim 10, wherein the MSSAS is further configured to synchronously process decimated and non-decimated signals from the ADCs.

15. The method of claim 11, wherein the asynchronous FIFO unit is configured to process an entire data stream.

16. The method of claim 10, wherein received data is controlled by service data.

17. The method of claim 10, wherein part of the digitized signals generated by each of the ADCs is deleted after decimation.

18. The method of claim 10, wherein the MSSAS processes digitized signals from multiple ADCs simultaneously.

19. An apparatus comprising:
a communication modem configured to receive a digitized signal from a first ADC in communication with a first RF path and a first antenna receiving a first signal, the communication modem configured to process the digitized signal and generate a first processed signal based on a modem clock, the communication modem further configured to transmit the first processed signal to a DAC in communication with an R+1 RF path and an R+1 antenna;
a navigation channel configured to process a filtered GNSS signal received from a filter, the filter configured to receive and filter a digitized GNSS signal received from a second ADC, the second ADC configured to receive and digitize a GNSS signal received from a second RF path in communication with a second antenna receiving the GNSS signal;
an R antenna configured to receive an R signal and transmit the R signal via an R RF path configured to process the R signal based on an R clock and transmit a second processed signal to an R ADC configured to digitize the second processed signal;
a multichannel synchronous signals analysis system (MSSAS) configured to receive output of the first ADC, the second ADC, and the R ADC, and process those outputs using a plurality of decimators each configured to output data to one of a respective plurality of data receivers; and
a CPU configured to control the first RF path, the second RF path, the R RF path, and the R+1 RF path, the first ADC, the second ADC, and the R ADC, the DAC, the communication modem, the filter, the navigation channel, and the MSSAS.

20. The apparatus of claim 19, wherein the ADC outputs are input to the MSSAS which is further configured to process the ADC outputs and re-synchronize the ADC outputs to a system clock using an asynchronous FIFO unit.

21. The apparatus of claim 1, wherein the MSSAS is further configured to process non-decimated signals from the ADCs.

22. The method of claim 10, wherein the MSSAS is further configured to process non-decimated signals from the ADCs.

* * * * *